May 12, 1959     A. G. FOX     2,886,785
WAVE TRANSDUCER
Filed July 30, 1952
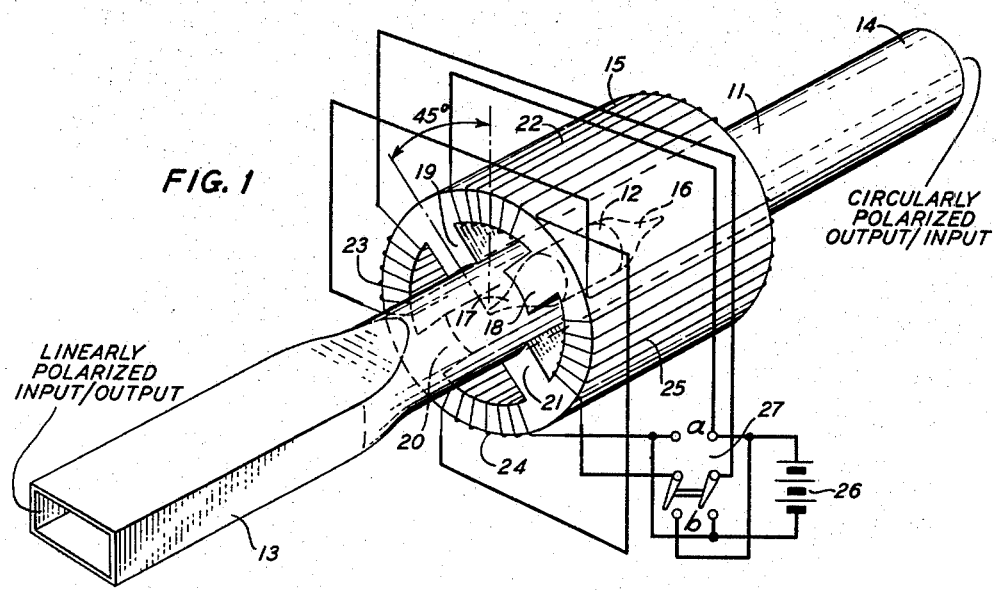
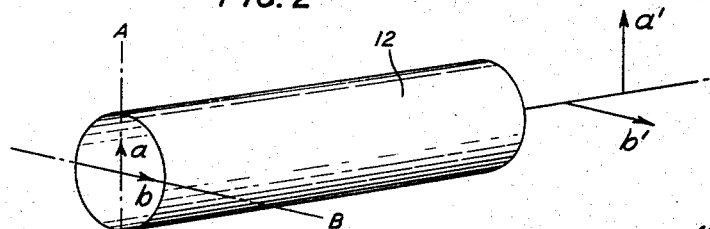
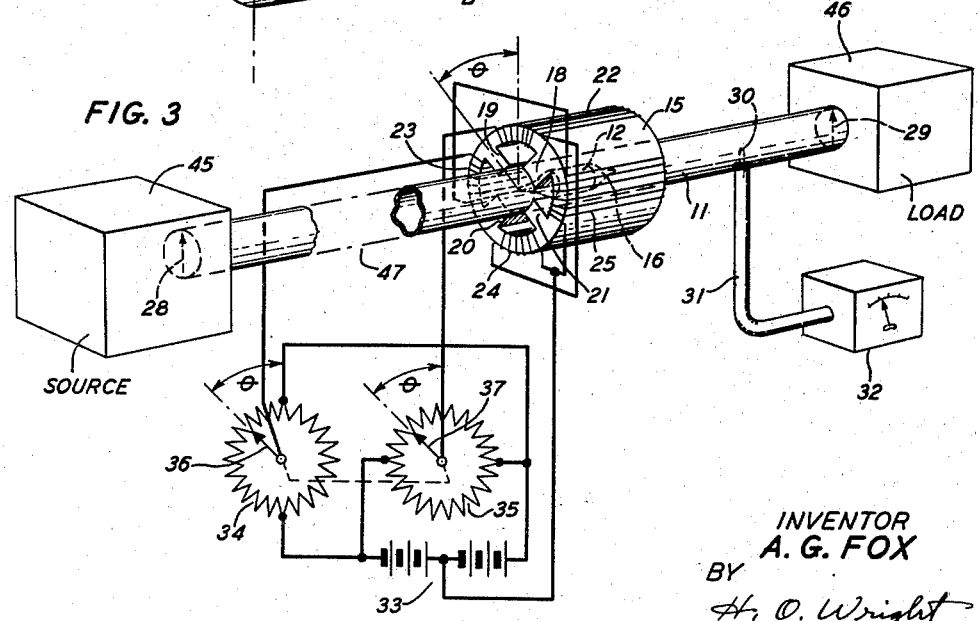
INVENTOR
A. G. FOX
BY
H. O. Wright
ATTORNEY United States Patent Office 2,886,785
Patented May 12, 1959

2,886,785
WAVE TRANSDUCER

Arthur G. Fox, Eatontown, N.J., assignor to Bell Telephone Laboratories, Incorporated, New York, N.Y., a corporation of New York Application July 30, 1952, Serial No. 301,726

14 Claims. (Cl. 333—21)

This invention relates to electromagnetic microwave transmission systems and, more particularly, to transducers or converters for changing the type or form of polarization of wave energy in said systems.

An object of the invention is to convert by means of improved and simplified apparatus from linearly polarized electromagnetic wave energy to circularly polarized electromagnetic wave energy, and conversely, to convert from circularly polarized to linearly polarized electromagnetic wave energy.

Linearly polarized waves and circularly polarized waves have been employed in the art for numerous functions, and various applications and uses for the several transducers heretofore employed for converting therebetween are well known. However, several specific uses for which the particular transducer in accordance with the present invention is well suited will be mentioned hereinafter. The linearly polarized waves here referred to are those whose field pattern does not change direction with progression of time as the wave is propagated along a guided transmission path but rather merely varies in amplitude. On the other hand, in the circularly polarized wave the cross-sectional field pattern thereof rotates in the plane of the cross-section as time progresses and does not change in amplitude. The latter should not be confused with the circular electric or circular magnetic waves which have no direction of polarization.

In accordance with the invention, it has been found that an element of ferromagnetic material under the influence of a transverse magnetic field has differential phase shift properties, i.e., the element introduces a certain phase delay to electromagnetic energy linearly polarized in the plane of the field and a different phase delay to energy linearly polarized perpendicular to this field. When this phase difference is made to equal 90 degrees, in accordance with considerations to be detailed hereinafter, and when the plane of either maximum or minimum phase delay is inclined 45 degrees to the plane of polarization of a linearly polarized electromagnetic wave, one component of the wave will be delayed 90 degrees with respect to the component perpendicular thereto on passing through the element. As will be shown, this results in converting a linearly polarized wave into a circularly polarized wave.

In the ferromagnetic differential phase shift elements in accordance with the invention, both the degree of phase differential and the inclination of the planes of phase shift are determined by the transverse magnetic field. Therefore the strength of the magnetic field is electrically adjusted to obtain the necessary 90 degree differential phase shift. In accordance with one feature of the invention the plane of maximum phase delay may be inclined 45 degrees clockwise with respect to the linear wave to produce a clockwise rotating circularly polarized wave and/or may be electrically shifted to a similar counterclockwise inclination to produce a counterclockwise rotating circularly polarized wave.

The circularly polarized wave may be considered as one species of the more general class of waves having rotating field patterns of which the elliptically polarized wave is another example. In the circularly polarized wave, the perpendicular components referred to above have equal amplitudes. If the two components are not of equal amplitude, the wave is elliptically polarized, the degree of ellipticity depending upon the amplitude difference. A familiar difficulty in guided wave transmission systems is that a normally linearly polarized wave is often undesirably converted into an elliptically polarized wave having an unpredictable degree of ellipticity. Such conversion may be the result of small asymmetrical reactance effects along the guided system introduced by slight irregularities in the system such as small bends in a wave guide, for example.

It is, therefore, another object of the invention to reconvert a wave of arbitrary ellipticity into a perfect linearly polarized wave.

In accordance with this object of the invention, the planes of phase shift of the ferromagnetic element are easily variable by remote electrical control in accordance with one feature of the invention so that the planes may be aligned at the required acute angle with the components of any elliptically polarized wave to convert this wave into a linearly polarized wave.

These and other objects, the nature of the present invention, and its various features and advantages, will appear more fully upon consideration of the various specific illustrative embodiments shown in the accompanying drawings and in the following detailed description of these embodiments.

In the drawings:

Fig. 1 is a perspective view of a transducer for converting between linearly polarized and circularly polarized wave energy, in accordance with the invention;

Fig. 2, given for the purpose of explanation, is a schematic representation of a portion of Fig. 1; and Fig. 3 shows a useful combination including a transducer, in accordance with the invention, for converting a wave of elliptical polarization into a linearly polarized wave.

In more detail, Fig. 1 illustrates an embodiment of a transducer in accordance with the invention comprising a section of wave guide 11 which may be of circular cross-section, and an element of ferromagnetic material 12, of the type and having the characteristics to be described, interposed in guide 11. The left-hand end of guide 11 is connected to suitable means for supporting the linearly polarized electromagnetic waves and for applying them with a given plane of polarization to element 12. This means is illustrated in the embodiment of Fig. 1 as a section of rectangular wave guide 13 which tapers smoothly and gradually into the circular cross-section of guide 11 to which it is integrally connected. The rectangular wave guide 13 will accept and support only linearly polarized waves ($TE_{10}$) in which the electric vector, which determines the plane of polarization of the wave, is parallel to the short side of the rectangular waveguide. The dimension of guide 11 is preferably chosen so that only the several planes of polarization of dominant $TE_{11}$ mode in circular guide can be propagated. By means of the smooth transition from the rectangular cross-section of guide 13 to the circular cross-section of guide 11, the $TE_{10}$ mode plane polarized parallel to the narrow dimension of the rectangular cross-section of guide 13, may be coupled to and from the $TE_{11}$ mode in circular guide 11 which has a similar or parallel plane of polarization. It is obvious to one skilled in the art that any of a number of other well-known coupling means having plane of polarization-selective transmission characteristics may be employed in lieu of rectangular guide 13 to couple a linearly polarized wave to the proper plane of polarization in circular guide 11. The right end of guide 11 is connected to suitable means for supporting the circularly polarized electromagnetic waves which in its simplest form may comprise an extension 14 of circular guide 11. However, any of the other wave-guide cross-sectional shapes, such as square cross-section, known to support circularly polarized waves may be employed for wave-guide section 14 at the right of element 12. On both sides of element 12 there are located conical transition members 16 and 17 which may be of dielectric material such as polystyrene or of the same material as element 12 and are provided to cut down reflections from the faces of element 12.

Surrounding element 12 and guide 11 is suitable means for producing a constant magnetic field, transverse to the axis of guide 11 and passing through element 12 in a plane inclined at the acute angle of 45 degrees to the plane of polarization of wave energy supported in rectangular guide 13.

As illustrated in Fig. 1, this field may be supplied by the solenoid structure comprising a magnetic core 15 having, for example, four internally directed pole pieces 18, 19, 20, and 21, preferably equally displaced to bear upon the periphery of guide 11 along narrow oppositely disposed longitudinal lengths of the outside wall thereof. Upon core 15, between each of the pole pieces, are placed turns of wire 22, 23, 24, and 25. Opposite turns 22 and 24 are so wound and connected in series to a source of potential 26 to produce like poles, for example, N poles in pole pieces 18 or 21 and opposite like S poles in pole pieces 19 or 20. The remaining turns 23 and 25 are so wound and connected in series through reversing switch 27 to source 26 to produce N poles in pole pieces 18 and 19 and S poles in pole pieces 20 and 21 when switch 27 is in position *a* and the reverse of these polarities when switch 27 is in position *b*. Thus the total field produced in core 15 extends from pole piece 18 to pole piece 20 with no field between pieces 19 and 21 when switch 27 is in position *a*. When switch 27 is in position *b* the field is shifted 90 degrees to extend between pole pieces 19 and 21. Both fields are inclined at 45 degrees to the plane of polarization of wave energy in guide 13 and the particular field to be chosen for a given application will become apparent hereinafter. Alternatively, these fields may be supplied by a permanently magnetized structure rotatively mounted upon guide 11.

Element 12 may be a block of ferromagnetic material of the type exhibiting a Faraday-effect rotation of the plane of wave polarization when in the presence of a longitudinal magnetizing field. These materials comprise an iron oxide with a quantity of the oxide of nickel, magnesium, zinc, manganese, or other similar material in which the other oxides combine with the iron oxide in a spinel structure. This material is known as a ferromagnetic spinel or as ferrite, and is included in the broader class known as "gyromagnetic material." The term "gyromagnetic material" is employed here in its accepted sense as designating the class of materials having portions of the atom thereof that are capable of being aligned by an external magnetic field and capable of exhibiting a significant precessional motion at a frequency within the microwave range contemplated by the invention, this precessional motion having an angular momentum, a gyroscopic moment and a magnetic moment. As a specific example, element 12 may be a cylindrical block of nickel-zinc ferrite prepared in the manner disclosed in the copending application of C. L. Hogan, Serial No. 252,432, filed October 22, 1951, now United States Patent 2,748,353, granted May 29, 1956. It has been determined that when these materials are excited by a transverse magnetic field, they exhibit a permeability constant of one value to electromagnetic energy components plane polarized parallel to the exciting field and a different value to electromagnetic energy components plane polarized perpendicular to the field. This effect may theoretically be explained by the assumption that the ferromagnetic material contains unpaired electron spins which tend to line up with the applied magnetic field. An electromagnetic wave having the transverse component of its magnetic vector in the direction of the magnetic field (the electric vector perpendicular to the magnetic field) will be unable to reorient the electron spins to any appreciable extent and, hence, will see a permeability close to unity regardless of the strength of the magnetic field. A wave having the transverse component of its magnetic vector at right angles to the magnetic field will cause the electron spins to precess about the axis of the magnetic field in synchronism with the applied electromagnetic wave. Such a wave will see a permeability substantially different from unity because the precessing spins now yield a component of radio frequency flux density along the wave's magnetic vector. The amount of difference from unity will be determined by the strength of the magnetic field.

Since the phase velocity of a wave passing through a material depends upon the permeability of the material, a wave traversing the ferromagnetic material of element 12 with its electric vector plane polarized parallel to the magnetic field will exhibit a higher phase velocity than the wave plane polarized perpendicular to the magnetic field. An element having this property, namely, the ability to transmit two sets of waves polarized at right angles to one another with different speeds, will produce two different phase delays for the two planes of polarization and, accordingly, may be termed a "differential phase shift element." The value of this phase shift difference for a ferromagnetic element is approximately proportional to the thickness of the material traversed by the waves and to the intensity of the magnetization to which the material is subjected. It may be shown by mathematical analysis that provided the frequency of the wave energy is substantially greater than the gyromagnetic resonance frequency of the ferromagnetic material, this phase difference expressed in radians is substantially given by the expression $$l\sqrt{\frac{\epsilon\mu}{2}}\left(\frac{\gamma^2 M^2}{\omega}+\frac{\gamma^2 MH}{\omega}\right)$$

in which $l$ is the thickness of the material in meters, $\epsilon$ is the dielectric constant, $\mu$ is its permeability without exciting magnetic field, $M$ is the saturation magnetization of the material, $H$ is the exciting magnetic field, $\omega$ represents the frequency of the wave energy and $\gamma$ is the spectroscopic splitting factor of the material. In accordance with the invention, the differential phase shift of element 12 is made equal to 90 degrees by properly choosing the thickness of element 12 and the strength of the field by calculations in accordance with the above expression. However, since the strength of the field is easily adjusted by varying the currents in the solenoid, this adjustment may be readily made on an empirical basis.

The apparatus thus far described serves to convert a linearly polarized wave applied to guide 13 into a circularly polarized wave in guide 14, either clockwise or counterclockwise rotating, and may also serve to convert a circularly polarized wave from guide 14 into a linearly polarized wave in guide 13. This operation will most readily be understood upon consideration of the schematic representation of Fig. 2 which shows the 90 degree differential phase shift element 12 separated from the other components of Fig. 1.

Referring therefore to Fig. 2, the axis A designates the plane of wave energy of greatest phase velocity, i.e., under the conditions described above, the electric plane of polarization of wave energy parallel to the exciting magnetic field while the axis B designates the plane of wave energy of smaller phase velocity, i.e., the electric plane of polarization of wave energy perpendicular to the exciting magnetic field. This is indicated schematically by showing diametral electric vectors $a$ and $b$ corresponding to adjacent voltage maxima for two waves having planes of polarization parallel to the axes A and B, respectively, and entering element 12 from the left at the same instant. These vectors represent two components of a given wave at significant points, and by following the components through phase-shift element 12, the effects upon the wave as a whole may be observed. At the right of element 12 these two vectors are shown emerging displaced from one another, $a'$ having traveled a greater distance than $b'$ by virtue of its greater phase velocity. For convenience element 12 is shown alone in space, but it should be understood that the waves are conducted into and out of the section by suitable means, such as the adjoining wave guides 13 and 14 already described with reference to Fig. 1. As pointed out above, the properties of element 12 are adjusted so that the differential phase shift will be 90 degrees. Thus, vector $a'$ precedes $b'$ by one-quarter wavelength. It should be noted that this phase differential bears no direct relation to the absolute phase delay, which is not of concern here, but is the difference between the absolute phase delays of the two wave components.

Now examine the properties of the emerging wave as seen at some particular cross-section to the right of element 12. First the wave will appear to have an instantaneous electric vector $a'$ which points upward. Ninety degrees later in time the field pattern will have moved forward by one-quarter wavelength, and the electric vector $b'$ will point to the right. One hundred and eighty degrees later the vector will point downward. Two hundred and seventy degrees later the vector will point to the left. Thus these two emerging waves form a circularly polarized wave which rotates clockwise looking in the direction of propagation. Similarly, the two in-phase waves entering at the left, when added together vectorially, may be considered to form a linearly polarized wave at an angle of 45 degrees to axes A and B. Or, conversely, the two waves $a$ and $b$ are components of a linearly polarized wave oriented at 45 degrees between the axes A and B. Thus, it is demonstrated that a 90 degree differential phase section has the property of converting a linearly polarized wave into a circularly polarized wave when the input is oriented at 45 degrees to the principal axes A and B.

In accordance with a special feature of the present invention, the circularly polarized wave may be either clockwise rotating or counterclockwise rotating and it may be electrically changed from one direction of rotation to the other at will. In this connection it should be noted that in the explanatory Fig. 2 discussed above, the linearly polarized input wave was displaced clockwise from the A axis, the axis parallel to the exciting magnetic field. This resulted in a clockwise rotating circularly polarized wave and represents the condition obtained in the structure of Fig. 1 when switch 27 is in the $b$ position producing a field between pole pieces 19 and 21. However, in accordance with the present invention, the axes of phase shift are determined solely by the applied field and unlike differential phase shifters previously known, these axes may be shifted at will by shifting the inclination of the applied field. Thus when switch 27 is placed in the $a$ position, the field extends between pole pieces 18 and 20 and the linearly polarized wave is inclined counterclockwise to the field. This condition would be represented on Fig. 2 by the vector $b$ pointing to the left. The emerging circularly polarized wave will then rotate counterclockwise.

Consider now what happens if a circularly polarized wave is sent into a 90 degree section by sending a clockwise-rotating circularly polarized wave into element 12 from the right. The first two voltage maxima are indicated on Fig. 2 by the vectors at the right as $b'$ and $a'$. Again, the $a'$ component travels more rapidly than the $b'$ component and catches up with it as shown by vector $a$ and vector $b$ at the left. Vectors $a$ and $b$ when added together now form a linearly polarized wave at an angle of 45 degrees counterclockwise from axis A. Similarly, if a counterclockwise-rotating wave is sent into the section from the right, the emerging wave will be linearly polarized at an angle of 45 degrees clockwise from axis A.

Having thus described the apparatus comprising and the operation of the converter of Fig. 1, several useful applications therefor may be mentioned. The principal application is, of course, the production of circularly polarized waves. These waves are not readily produced by the usually known generators of wave energy but must be obtained by conversion from other types. One application of circularly polarized waves is found in radio transmission or radar systems where it is not known in advance what the angle of the plane of polarization of a distant receiver or reflector will be. It is, therefore, convenient to radiate a circularly polarized wave since at least half the power will then be received regardless of the angle.

Another application of the converter is found in design of wave-guide rotating joints. A transmitter may deliver microwave power by way of a wave guide to antenna which must be free to rotate. It is obvious, however, that the plane of polarization received on the antenna side of the rotating joint will turn as the antenna is rotated, and this must be avoided. A solution is provided by employing a converter in accordance with the present invention on either side of the rotating joint. The one on the transmitter side is oriented so as to convert the linearly polarized wave delivered from the transmitter into a circularly polarized wave. This circularly polarized wave is then transmitted across the joint and is reconverted into a linearly polarized wave at the required angle by the second converter. Since the angle of this final plane of polarization is determined only by the orientation of the second converter section and since this section turns with the antenna as a unit, it follows that, relative to the antenna, the output plane of polarization is independent of the orientation of the antenna.

A further application of the converter in accordance with the invention is described and claimed in my co-pending application Serial No. 304,609, filed August 15, 1952 now United States Patent 2,787,765 granted April 2, 1957.

In Fig. 3 a related aspect of the invention is illustrated. Fig. 3 depicts source 45 of linearly polarized electromagnetic waves connected to load 46 for similarly linearly polarized waves by a transmission path 47. Both source 45 and load 46 are of types such that efficient transfer of power therebetween is obtained only when the linearly polarized waves, represented by vector 28, leaving source 45 retain their linear polarization on arrival at load 46 in a plane of polarization represented by vector 29. Transmission path 47, however, represents a path of the type so often encountered in practice having bends, joints, or slight physical imperfections, any of which tend to introduce asymmetrical reactance effects to the energy transmitted therealong. As is well known, these effects convert the normally linearly polarized wave into an elliptically polarized wave. The degree of ellipticity so introduced is seldom predictable and can be measured only with substantial difficulty. However, if all of the available wave power is to be received by load 46, this ellipticity must be resolved by reconverting the elliptically polarized wave to a linear wave having the plane of polarization of vector 29.

In accordance with the invention, the elliptically polarized wave is converted into a linearly polarized wave by interposing a ferromagnetic 90 degree differential phase shift apparatus in which the orientation of the planes of phase shift is electrically positioned at any angle to the linear polarization of waves in the transmission path at a point immediately preceding load 46. Inasmuch as this apparatus is substantially similar to the one hereinbefore described with reference to Fig. 1, corresponding reference numerals have been employed to designate corresponding components. The windings on core 15 are, however, connected to supply a transverse magnetic field to ferromagnetic element 12 which field is inclined at an angle $\theta$ with respect to the desired linear polarization. As shown in Fig. 3, the leads from windings 24 and 25 are connected to the center tap of a source of potential 33. Across source 33 are connected two circular rheostats 34 and 35, ganged together with a 90 degree difference in the positions of their arm contacts 36 and 37, respectively, relative to the electrical connections to source 33. The lead from winding 23 is connected to arm 36 and the lead from winding 22 to arm 37. Thus when the arm 36 is located at the center potential point and arm 37 at a maximum potential point (both arms horizontal according to Fig. 3), a magnetic field developed by windings 22 and 24 will extend through element 12 horizontally. When arms 36 and 37 are vertical, the field through element 12 will be vertical. At intermediate points the magnetic field will make an angle with the linear polarization corresponding to the angle $\theta$ made by arms 36 and 37 with their vertical position. Therefore the orientation of the planes of phase shift of element 12 is variable through a full 360 degrees by electrical control.

In operation the angle $\theta$ is adjusted to a value producing maximum power in load 46. If the nature of load 46 is not such that this condition may be determined directly, an auxiliary detector comprising, for example, a probe 30 or other plane of polarization selective sampling means may be inserted in guide 11 to be principally effective therein for wave energy plane polarized as represented by vector 29. Probe 30 is connected by line 31 to meter 32. Thus, the proper value for the angle $\theta$ is indicated by a maximum reading on meter 32 at which value substantially perfectly polarized linear waves are delivered to load 46.

It has been demonstrated above in connection with Fig. 2 that a circularly polarized wave may be resolved into two components of equal amplitude, delayed with respect to each other by one-quarter wavelength, and that this wave may be converted into a linearly polarized wave by bringing these components into phase by a 90 degree ferromagnetic differential phase shift element. The operation of the converter of Fig. 3 for elliptically polarized waves may be similarly analyzed when it is recalled that any elliptically polarized wave is another form of rotating field pattern wave and may be resolved into two components at right angles to each other of unequal amplitude and delayed with respect to each other by one-quarter wavelength. The degree of ellipticity depends upon the relative amplitudes of the two components since these components represent the major and minor axes of the elliptical field pattern. The two unequal components of the elliptically polarized wave may be brought into phase with one another by advancing or retarding either component one-quarter of a wavelength relative to the other component. Thus by passing the elliptically polarized wave through the differential phase shift element 12 with the magnetic field so oriented that the principal axes of phase shift thereof lie along the major and minor axes of the polarization ellipse, the wave will emerge linearly polarized with the axis of polarization inclined at an angle to the principal axes of section 12. Thus the magnetic field should be directed along the major or minor axis of the polarization ellipse. The resulting linearly polarized wave will have its axis of polarization inclined at an angle to the direction of the magnetic field whose tangent is given by the ratio of the major to the minor axes of the polarization ellipse, or its reciprocal. In order for this wave to be completely utilized by the load, the load 46 must be rotated so that its plane of polarization 29 is the same as that of the linearly polarized wave leaving element 12; or alternatively the plane of polarization of the wave must be reoriented by means not shown but which are well known in the art so that it is the same as the plane of polarization 29 of the load 46. The proper adjustment of the field orientation $\theta$ and the load orientation will be indicated by a maximum reading on meter 32 providing the probe 30 is kept parallel with the plane of polarization 29.

In all cases, it is understood that the above-described arrangements are simply illustrative of a small number of many possible specific embodiments which can represent applications of the principles of the invention. Numerous and varied other arrangements can readily be devised in accordance with said principles of those skilled in the art without departing from the spirit and scope of the invention.

What is claimed is:

1. Apparatus for converting between electromagnetic wave energy of linearly polarized field pattern and wave energy of rotating field pattern comprising an element of magnetically polarizable gyromagnetic material, means for propagating said wave energy through said element comprising a wave guide adapted to support radio-frequency wave energy polarized in any of a plurality of planes of polarization, means on one side of said element receptive to a given plane of polarization of said linearly polarized wave, and means for applying a magnetic field to said element transverse to said direction of propagation and inclined at an acute angle to said given plane of polarization, the strength of said field falling outside the region of ferromagnetic resonance for said element at a frequency within the operating range.

2. The combination according to claim 1, wherein the strength of said magnetic field and the thickness of said element are proportioned to produce a quarter wave differential delay between components of said linear wave energy polarized parallel to said field and components of said linear wave energy polarized perpendicular to said field.

3. In combination, an element of magnetically polarizable gyromagnetic material, means for applying a magnetic field to said element, and means for propagating linearly polarized electromagnetic wave energy through said element with an actual component of wave energy perpendicular to said field and an actual component of wave energy parallel to said field, said propagating means comprising a wave guide adapted to support radio-frequency wave energy polarized in any of a plurality of planes of polarization and directing said energy along a propagation path transverse to said field, the strength of said field being proportioned to provide substantial differential phase delay between said components with negligible attenuation.

4. In combination, an element of ferrite material, means for propagating electromagnetic wave energy through said element comprising a wave transmission path adapted to support wave energy polarized in any of a plurality of planes of polarization, means for applying a magnetic field to said element transverse to said direction of propagation, said magnetized element having a gyromagnetic resonance frequency substantially less than the frequency of said wave energy, and means for varying the angle between said field and the plane of polarization of said wave energy.

5. In combination, an element of magnetically polarizable gyromagnetic material, means for propagating linearly polarized electromagnetic wave energy through said element, said means comprising a wave guide adapted to support radio-frequency wave energy polarized in any of a plurality of planes of polarization, and means for applying a magnetic field to said element transverse to said direction of propagation and inclined at an acute angle to said given plane of polarization, the strength of said field falling outside the region of ferromagnetic resonance for said element at a frequency within the operating range.

6. Apparatus for converting between linearly polarized electromagnetic wave energy and circularly polarized electromagnetic wave energy comprising an element of magnetically polarizable gyromagnetic material, means for propagating said wave energy through said element, said means comprising transmission means on one side of said element to support said linearly polarized waves in a given plane of polarization and a wave guide supporting said element and extending beyond said element on the other side thereof, said wave guide being adapted to propagate radio-frequency energy in the form of said circularly polarized waves, and means for applying a magnetic field to said element transverse to said direction of propagation and inclined 45 degrees to said given plane of polarization, the strength of said field falling outside the region of ferromagnetic resonance for said element at a frequency within the operating range.

7. Apparatus for transforming electromagnetic wave energy from linearly polarized waves to circularly polarized waves comprising an element of ferromagnetic ferrite material, plane of polarization-selective transmission means for applying said linearly polarized waves to one side of said element in a given plane of polarization, transmission means on the other side of said element for receiving said circularly polarized waves, means for propagating wave energy through said element and between said transmission means on opposite sides thereof comprising a wave guide adapted to support radio-frequency wave energy polarized in any of a plurality of planes of polarization, and a magnetic field applied to said element, said field being transverse to the direction of propagation of said wave energy through said element and inclined at 45 degrees to said given plane of polarization, and proportioned to provide substantial differential phase shift with negligible attenuation to said wave energy propagating through said apparatus.

8. Apparatus for transforming electromagnetic wave energy between a linearly polarized wave and a circularly polarized wave comprising, a section of circular cross-sectioned wave guide for supporting said circularly polarized wave, a polarization-selective connection at one end of said guide for linearly polarized waves therein with a given plane of polarization, an element of magnetically polarizable gyromagnetic material interposed in said guide between said connection and the other end of said guide, and a magnetizing field applied to said element, said field being transverse to said guide and inclined at 45 degrees to said given plane of polarization, the strength of said field falling outside the region of ferromagnetic resonance for said element at a frequency within the operating range.

9. Apparatus for converting between electromagnetic wave energy of linearly polarized field pattern and wave energy of rotating field pattern comprising, a section of circular cross-sectional wave guide, a section of rectangular cross-sectional wave guide, said rectangular section tapering smoothly into said circular section, an element of magnetically polarizable gyromagnetic material interposed in said circular guide, and a magnetizing field applied to said element, said field being transverse to the longitudinal dimension of said guide sections and inclined at an acute angle to the plane of one wall of said rectangular section, the strength of said field falling outside the region of ferromagnetic resonance for said element at a frequency within the operating range.

10. The combination according to claim 9, wherein said angle is 45 degrees.

11. The combination according to claim 9, wherein said element comprises a block of a ferromagnetic material having a spinel structure.

12. Apparatus for converting wave energy of elliptically rotating field pattern having major and minor axes of ellipticity to wave energy of linearly polarized field pattern, said apparatus comprising element of magnetically polarizable gyromagnetic material, a wave guide supporting said element and extending beyond said element on one side thereof, said wave guide being adapted to propagate radio-frequency wave energy in the form of said elliptically rotating field pattern and to apply said elliptical wave energy to said element for propagation through said element, means for applying a magnetic field to said element transverse to said direction of propagation and inclined parallel to one of said axes of ellipticity, the strength of said field falling outside the region of ferromagnetic resonance for said element at a frequency within the operating range, and means on the other side of said element for receiving said linearly polarized wave in a plane of polarization inclined at an acute angle to said field.

13. Apparatus for converting between electromagnetic wave energy of linearly polarized field pattern and wave energy of rotating field pattern comprising an element of magnetically polarizable gyromagnetic material having a like transverse symmetry for every component of said linearly polarized wave, means for propagating said wave energy through said element comprising a wave guide adapted to support radio-frequency wave energy polarized in any of a plurality of planes of polarization, means on one side of said element receptive to a given plane of polarization of said linearly polarized wave, and means for applying a magnetic field to said element transverse to said direction of propagation and inclined at an acute angle to said given plane of polarization, the strength of said field falling outside the region of ferromagnetic resonance for said element at a frequency within the operating range.

14. In combination, an element of magnetically polarizable gyromagnetic material, means for applying a magnetic field to said element, and means comprising a wave guide adapted to support radio-frequency wave energy polarized in any of a plurality of planes of polarization for propagating linearly polarized electromagnetic wave energy through said element with an actual component of wave energy perpendicular to said field and an actual component of wave energy parallel to said field, the strength of said field being proportioned to provide substantial differential phase delay between said components with negligible attenuation, the transverse shape of said element having similar dimensions measured parallel to each of said actual components, said propagating means directing said energy along a propagation path transverse to said field.

References Cited in the file of this patent

UNITED STATES PATENTS

| | | |
|---|---|---|
| 1,802,699 | Bloomenthal | Apr. 28, 1931 |
| 2,257,783 | Bowen | Oct. 7, 1941 |
| 2,402,948 | Carlson | July 2, 1946 |
| 2,532,157 | Evans | Nov. 28, 1950 |
| 2,599,753 | Fox | June 10, 1952 |
| 2,607,849 | Purcell | Aug. 19, 1952 |
| 2,629,079 | Miller | Feb. 17, 1953 |
| 2,644,930 | Luhrs | July 7, 1953 |
| 2,650,350 | Heath | Aug. 25, 1953 |
| 2,719,274 | Luhrs | Sept. 7, 1955 |
| 2,745,069 | Hewitt | May 8, 1956 |
| 2,787,765 | Fox | Apr. 2, 1957 |
| 2,798,205 | Hogan | July 2, 1957 |

OTHER REFERENCES

Publication I: "N.B.C. Magnetic Attenuator," Nat. Bur. Standards Technical News Bulletin, August 1951, pages 110–11.

Hewitt: "Microwave Resonance Absorption," Physical Review, vol. 73, No. 9, May 1, 1948, pages 1118–19.

Darrow: Bell System Technical Journal, vol. 32, Nos. 1 and 2, January and March 1953, pages 74–99 and 384–405. (Copy in Scientific Library.)

Spectroscopy at Radio and Microwave Frequencies (D. J. E. Ingram), published by Butterworths Scientific Publications (London), 1955, page 215 relied on. (Copy in Scientific Library.)